(12) United States Patent
Peng et al.

(10) Patent No.: US 8,432,680 B2
(45) Date of Patent: Apr. 30, 2013

(54) MOUNTING APPARATUS FOR DATA STORAGE DEVICE AND VIBRATION ABSORBING MEMBER OF THE SAME

(75) Inventors: Wen-Tang Peng, Taipei-Hsien (TW); Guang-Yi Zhang, Shenzhen (CN); Jia-Qi Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 651 days.

(21) Appl. No.: 12/610,354

(22) Filed: Nov. 2, 2009

(65) Prior Publication Data

US 2011/0001409 A1    Jan. 6, 2011

(30) Foreign Application Priority Data

Jul. 3, 2009    (CN) .......................... 2009 1 0303969

(51) Int. Cl.
*H05K 5/00*    (2006.01)
*H05K 7/00*    (2006.01)

(52) U.S. Cl.
USPC ............ 361/679.36; 361/679.33; 361/679.34; 361/679.35; 361/679.37; 361/679.38; 361/679.39

(58) Field of Classification Search ............. 361/679.33, 361/679.34, 679.35, 679.36, 679.37, 679.38, 361/679.39
See application file for complete search history.

(56) References Cited

U.S. PATENT DOCUMENTS

| 6,918,174 B2 * | 7/2005 | Kim et al. ................. 29/603.04 |
| 7,036,783 B2 * | 5/2006 | Chen et al. ................ 248/298.1 |
| 2008/0259554 A1 * | 10/2008 | Qin et al. ...................... 361/685 |

\* cited by examiner

*Primary Examiner* — Anthony Haughton
(74) *Attorney, Agent, or Firm* — Altis Law Group, Inc.

(57) ABSTRACT

A mounting apparatus is provided for a data storage device. The mounting apparatus includes a mounting bracket receiving the data storage device, and a number of vibration absorbing members attached to opposite sides of the data storage device. Two sliding slots are respectively defined in opposite sidewalls of the mounting bracket. Each of the vibration absorbing members includes a fastener engaged with a corresponding side of the data storage device, a supporter slidably received in a corresponding sliding slot of the mounting bracket, and a damping body sandwiched between the fastener and the supporter.

13 Claims, 5 Drawing Sheets

MOUNTING APPARATUS FOR DATA STORAGE DEVICE AND VIBRATION ABSORBING MEMBER OF THE SAME

BACKGROUND

1. Technical Field

The present disclosure relates to device mounting, and more particularly, to a mounting apparatus for a data storage device and a vibration absorbing member of the mounting apparatus.

2. Description of the Related Art

Electronic devices, such as computers or servers, often include data storage devices such as hard disk drives, compact disk read-only memory drives, digital video disc drives, and floppy disk drives mounted on a bracket secured to a device chassis by screws. Since the data storage devices directly contact the bracket and the chassis of the computer, vibration generated by the data storage devices in operation can create sympathetic vibration of the bracket and the chassis of the computer, thereby magnifying impact to the data storage devices and creating noise.

DETAILED DESCRIPTION

Figure 1:
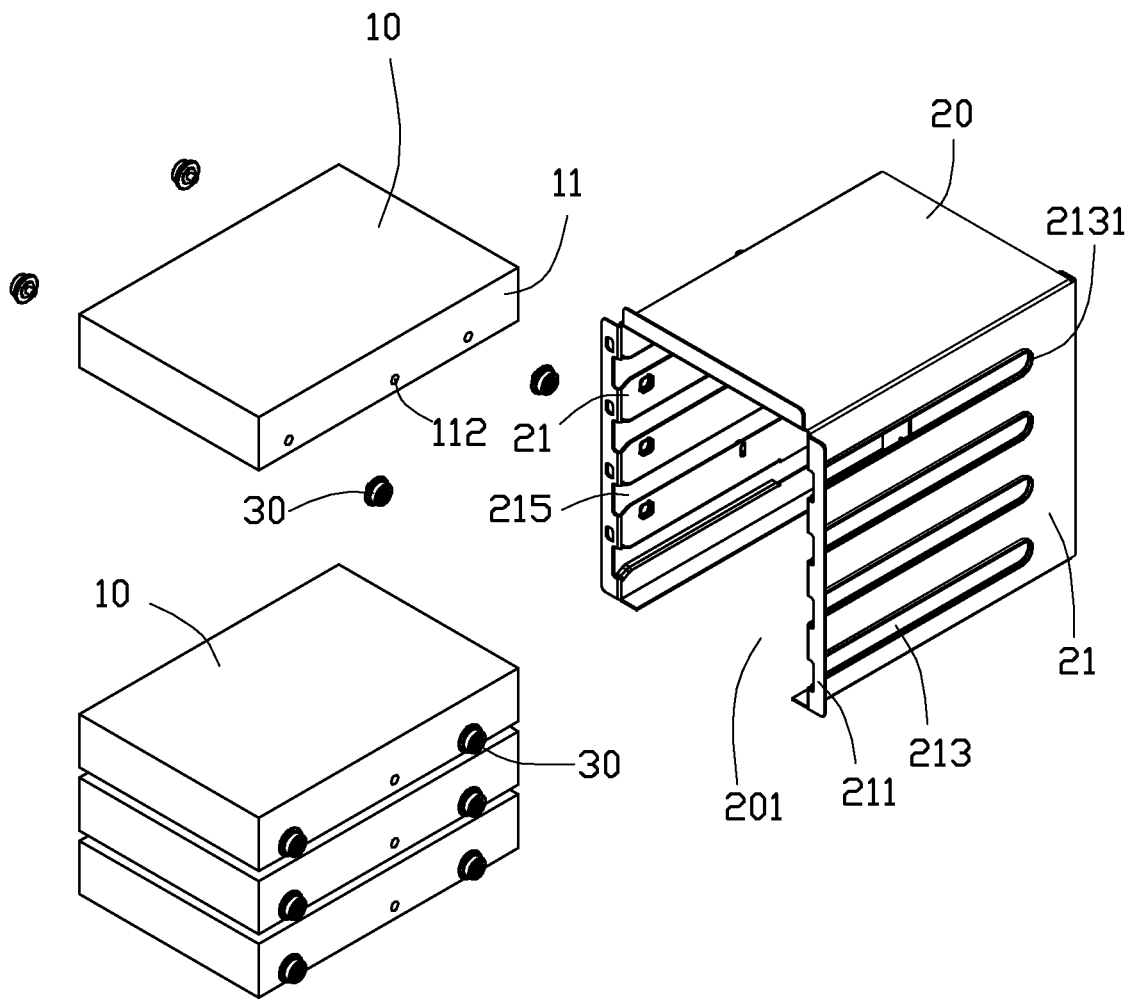
FIG. 1 is an exploded, isometric view of an exemplary embodiment of a mounting apparatus and a plurality of data storage devices, the mounting apparatus including a plurality of vibration absorbing members.

Referring to FIG. 1, in an exemplary embodiment, a mounting apparatus is provided to house a plurality of data storage devices 10. The mounting apparatus includes a mounting bracket 20 to receive the plurality of data storage devices 10 and a plurality of vibration absorbing members 30 attached to the plurality of data storage devices 10 and engaging the mounting bracket 10.

Each of the plurality of data storage devices 10 includes two opposite attachment surfaces 11, each attached surface 11 defining a plurality of fastener holes 112. In one embodiment, two of the plurality of vibration absorbing members 30 are attached to each of the attachment surfaces 11 of each of the plurality of storage devices 10. In another embodiment, one or more than two of the plurality of vibration absorbing members 30 are attached to each of the attachment surfaces 11 of each of plurality of the storage devices 10.

The mounting bracket 20 includes two parallel sidewalls 21. Two flanges 211 respectively extend perpendicularly from corresponding ends of the sidewalls 21, away from each other. Each of the sidewalls 21 defines a plurality of parallel sliding slots 213, extending perpendicular to the flanges 211. Each of the sliding slots 213 includes a guiding portion 215 where a corresponding sidewall 21 meets the flange 211 connected to the sidewall 21.

Figure 2:
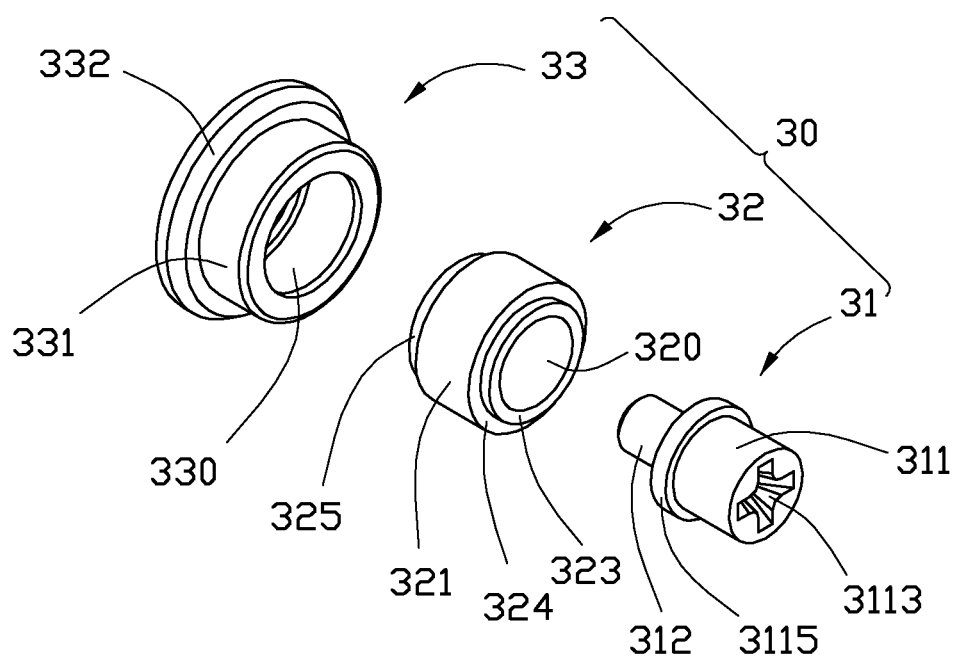
FIGS. 2 and 3 are exploded, enlarged views of an exemplary embodiment of a vibration absorbing member utilized in a mounting apparatus such as, for example, that of FIG. 1, shown from different perspectives.
Figure 3:
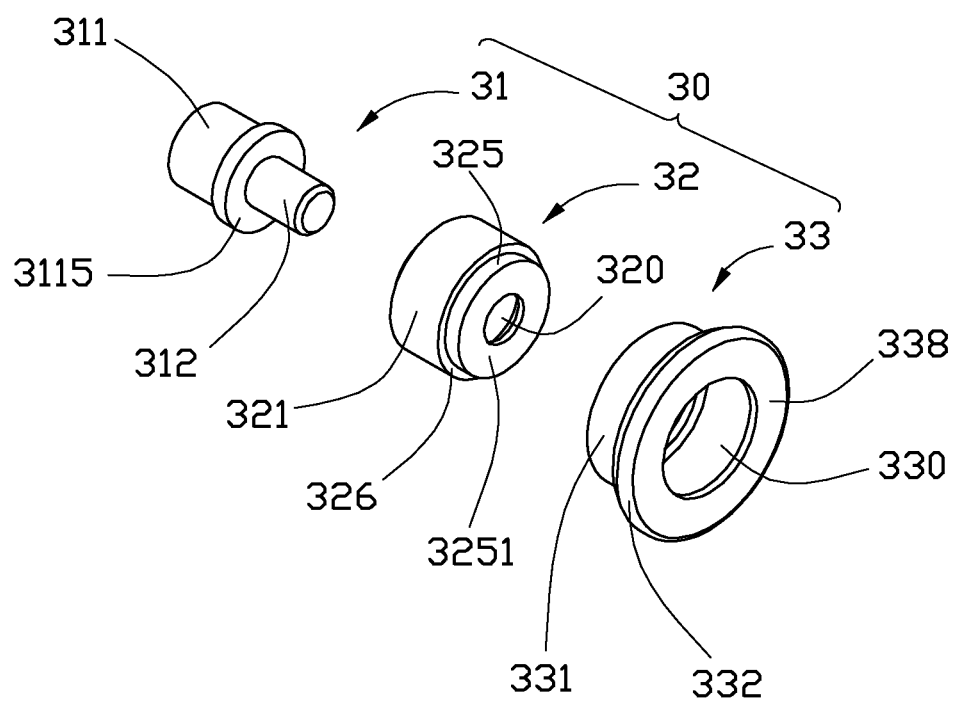

Referring to FIGS. 2 and 3, each vibration absorbing member 30 includes a fastener 31, a damping body 32, and a supporter 33. In one embodiment, the fastener 31 is conductive material, and includes an operating portion 311 and a threaded portion 312 extending from a first end of the operating portion 311. An engagement groove 3113, in this embodiment cross-shaped, is defined in a second end opposite to the first end of the operation portion 311, for engaging a tool such as a screwdriver. The operating portion 311 further includes a rim 3115 extending from a circumference of the first end of the operating portion 311.

The damping body 32 is conductive rubber. The damping body 32 is stepped and cylindrical, and includes a middle portion 321, an annular first protrusion 323, and an annular second protrusion 325 extending from opposite ends of the middle portion 321. Diameters of the first protrusion 323 and the second protrusion 325 are less than that of the middle portion 321, such that a first shoulder 324 and a second shoulder 326 (shown and labeled in FIG. 5) are respectively formed at the opposite ends of the middle portion 321 corresponding to the first protrusion 323 and the second protrusion 325. The damping body 32 axially defines a through hole 320. A circular retaining groove 328 (shown and labeled in FIG. 5) is defined in an inner wall bounding the through hole 320 of the damping body 32, adjacent to the second protrusion 325. A diameter of the retaining groove 328 is slightly less than an outer diameter of the rim 3115. In another embodiment, the damping body 32 may be a spring or other vibration absorbing element. A block portion 3251 is radially formed on a distal end of the second protrusion 325 of the damping body 32, to reduce access to the through hole 320.

In one embodiment, the supporter 33 is an aluminum alloy with a glossy surface. In other embodiments, the supporter 33 may be other conductive materials. The supporter 33 includes a cylindrical supporting portion 331 and an abutting portion 332 extending from a circumference of a first end of the supporting portion 331. A receiving hole 330 is axially defined in the supporter 33 and a diameter of the receiving hole 330 is slightly less than an outer diameter of the middle portion 321. The supporter 33 further radially forms two circular tabs 338 respectively at a second end of the supporting portion 331 and a distal end of the abutting portion 332, such that size of each opposite end of the receiving hole 330 is slightly less than the first protrusion 323 and the second protrusion 325 of the damping body 32.

Figure 5:
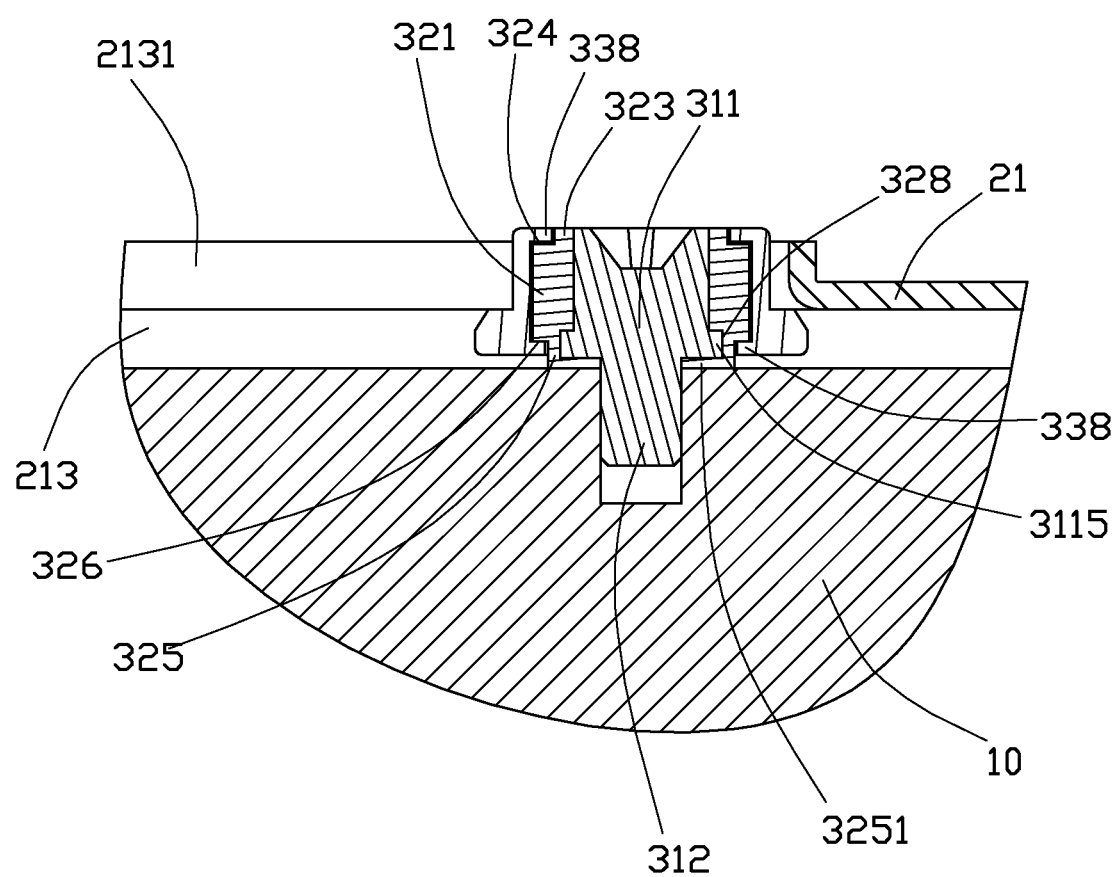
FIG. 5 is a partial, enlarged sectional view of FIG. 4, taken along the line V-V.

Referring to FIG. 5, during assembly of each of the plurality of vibration absorbing members 30, the threaded portion 312 of the fastener 31 extends through the through hole 320 of the damping body 32 from the first protrusion 323 out of the second protrusion 325. The fastener 31 is retained in the damping body 32 with the operating portion 311 of the fastener 31 engaged in the through hole 320 of the damping body 32 and the rim 3115 of the fastener 31 engaged in the retaining groove 328 of the damping body 32. The damping body 32 with the fastener 31 passes through the receiving hole 320 of the supporter 33 from the second end of the supporting portion 331, until the threaded portion 312 of the fastener 31 and the second protrusion 325 of the damping body 32 extend out of the abutting portion 332 of the supporter 33. Thus, the damping body 32 is fixed to the supporter 33 with the opposite tabs 338 abutting the first shoulder 324 and the second shoulder 326 of the clamping body 32, respectively.

Figure 4:
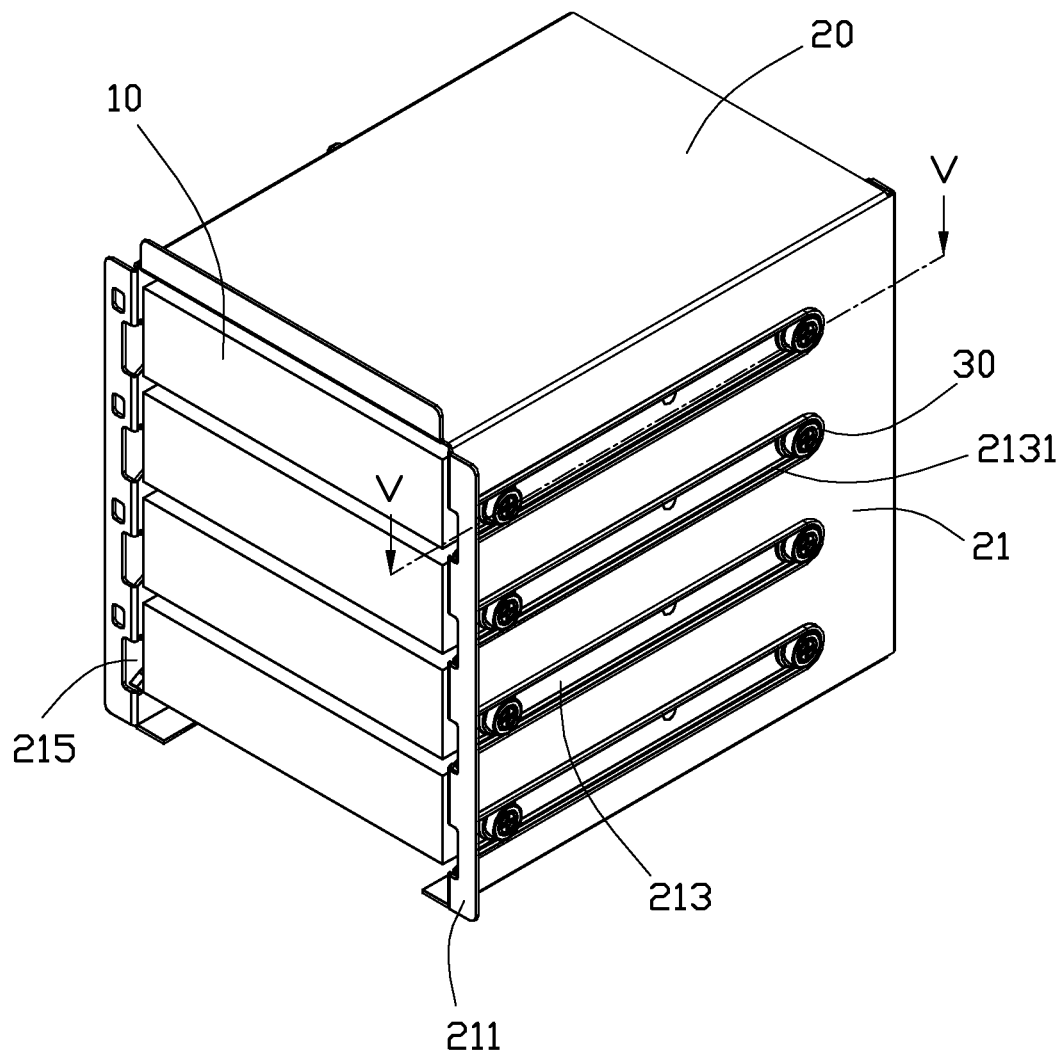
FIG. 4 is an assembled view of the mounting apparatus and the plurality of data storage devices of FIG. 1.

Referring to FIGS. 4 and 5, to attach the plurality of vibration absorbing members 30 to the corresponding data storage devices 10, the threaded portions 312 of the fasteners 31 are engaged in the corresponding fastener holes 112.

In assembling each of the plurality of data storage devices 10 to the mounting bracket 20, the data storage device 10 is received in the mounting bracket 20, with the supporting portions 331 of the supporters 33 of the vibration absorbing members 30 on the opposite mounting surfaces 11 of the data storage device 10 sliding into two corresponding sliding slots 213 in the opposite sidewalls 21 of the mounting bracket 20 through the guiding portions 215 of the sliding slots 213. The abutting portions 332 of the supporters 33 of the vibration absorbing members 30 abut inner surfaces of the sidewalls 21 of the mounting bracket 20. The second protrusions 325 of the damping bodies 32 of the vibration absorbing members 30 correspondingly abut the mounting surfaces 11 of the data storage device 10. The plurality of data storage devices 10 held in the mounting bracket 20 do not directly contact the mounting bracket 20. The plurality of vibration absorbing members 30 is disposed between and engages the corresponding data storage devices 10 and the mounting bracket 20, such that the plurality of vibration absorbing members 30 dampens vibration generated by the plurality of data storage devices 10 in operation, avoiding sympathetic vibration of the mounting bracket 20. Further, since the plurality of vibration absorbing members 30 are electrically conductive, static electricity is expelled from the plurality of data storage devices 10 promptly.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiments.

What is claimed is:

1. A mounting apparatus for a data storage device, the mounting apparatus comprising:
   a mounting bracket receiving the data storage device, the mounting bracket comprising opposite sidewalls, each sidewall defining a sliding slot; and
   at least two vibration absorbing members respectively attached to opposite sides of the data storage device and slidably engaged in the corresponding sliding slots of the sidewalls of the mounting bracket;
   wherein the at least two vibration absorbing members are disposed between the mounting bracket and the data storage device, such that the data storage device has no direct contact with the mounting bracket;
   wherein each of the at least two vibration absorbing members comprises a supporter slidably engaged in a corresponding sliding slot of the mounting bracket, and a damping body engaging the supporter and abutting a corresponding side of the data storage device;
   wherein each of the at least two vibration absorbing members further comprises a fastener fixed to the data storage device and engaged in the damping body of the vibration absorbing member;
   wherein the supporter defines a receiving hole, the damping body is engaged in the receiving hole of the supporter and defines a through hole, the fastener comprises a threaded portion engaging the corresponding side of the data storage device, and an operating portion extending from an end of the threaded portion and retained in the through hole of the damping body; and
   wherein the supporter comprises a cylindrical supporting portion and an abutting portion extending from a circumference of a first end of the supporting portion, the abutting portion has a diameter greater than a diameter of the supporting portion, the receiving hole axially extending through the supporter, the damping body comprising a cylindrical middle portion engaged in the receiving hole of the supporter.

2. The mounting apparatus of claim 1, wherein the supporting portion of the supporter is slidable in a corresponding sliding slot, and the abutting portion abuts an inner surface of the corresponding one of the sidewalls.

3. The mounting apparatus of claim 1, wherein the supporter further radially forms two tabs at opposite ends of the receiving hole, the damping body further comprises a first protrusion and a second protrusion extending from opposite ends of the middle portion, a first shoulder and a second shoulder are respectively formed at the opposite ends of the middle portion corresponding to the first protrusion and the second protrusion, and the tabs of the supporter respectively abut the first shoulder and the second shoulder of the damping body.

4. The mounting apparatus of claim 1, wherein a retaining groove is defined in an inner wall bounding the through hole of the damping body, and the operating portion of the fastener comprises a rim engaged in the retaining groove of the damping body.

5. The mounting apparatus of claim 1, wherein the fastener, the damping body, and the supporter are electrically conductive.

6. The mounting apparatus of claim 5, wherein the damping body is conductive rubber.

7. The mounting apparatus of claim 5, wherein the supporter is an aluminum alloy with a glossy surface.

8. The mounting apparatus of claim 1, wherein the sidewalls of the mounting bracket are parallel and sandwich the data storage device therebetween.

9. The mounting apparatus of claim 8, wherein two flanges respectively extend perpendicularly from corresponding ends of the sidewalls of the mounting bracket, and each sliding slot of the mounting bracket comprises a guiding portion where the corresponding sidewall and the corresponding flange meet.

10. A vibration absorbing member for being attached to a data storage device, and mounting the data storage device to a mounting bracket, the vibration absorbing member comprising:
    a fastener for fixedly engaging the data storage device;
    a supporter for engaging the mounting bracket, wherein the fastener is engaged in the supporter; and
    a damping body sandwiched between the fastener and the supporter, and resisting against the data storage device to keep the supporter apart from the data storage device;
    wherein the damping body is operable to damp vibration between the data storage device and the mounting bracket;
    wherein the supporter defines a receiving hole, the damping body is engaged in the receiving hole of the supporter and defines a through hole, the fastener comprises a threaded portion to engage the data storage device, and an operating portion extends from an end of the threaded portion and is retained in the through hole of the damping body;
    wherein the supporter comprises a cylindrical supporting portion, the receiving hole extends through the supporter along an axis of the supporting portion, and the damping body comprises a cylindrical middle portion engaged in the receiving hole of the supporter; and
    wherein the supporter further radially forms two tabs at opposite ends of the receiving hole thereof, the damping body further comprises a first protrusion and a second protrusion extending from opposite ends of the middle portion, a first shoulder and a second shoulder are respectively formed at the opposite ends of the middle portion corresponding to the first protrusion and the second protrusion, and the tabs of the supporter respectively abut the first shoulder and the second shoulder of the damping body.

11. The vibration absorbing member of claim 10, wherein the through hole of the damping body extends through the damping body, a retaining groove is defined in an inner wall bounding the through hole of the damping body, and the operating portion of the fastener comprises a rim engaging in the retaining groove of the damping body.

12. The vibration absorbing member of claim 10, wherein the fastener, the damping body, and the supporter are electrically conductive.

13. The vibration absorbing member of claim 12, wherein the damping body is conductive rubber.

* * * * *